Nov. 18, 1952         J. W. SAWYER ET AL         2,618,014
         APPARATUS FOR RECORDING SURFACE CONDITIONS
                    INSIDE TUBULAR ELEMENTS
Filed June 30, 1949                        3 Sheets-Sheet 3
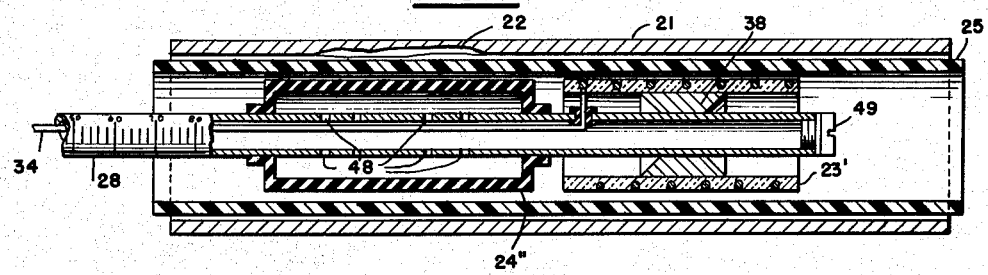
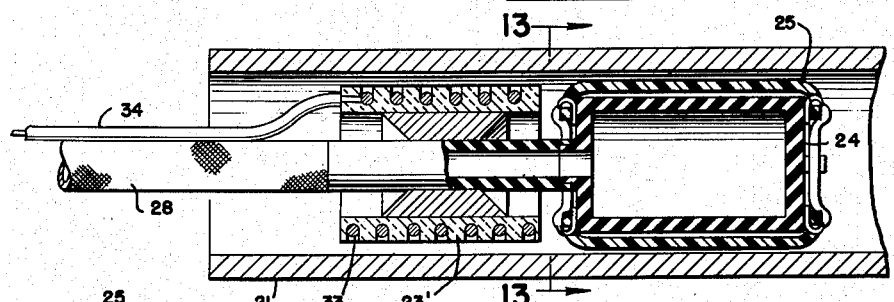
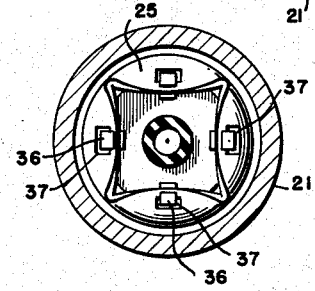
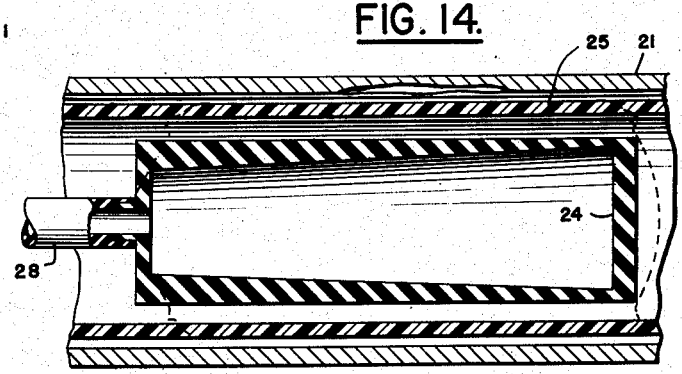
INVENTOR.
John W. Sawyer
BY Ephriam L. Sawyer
ATTORNEY Patented Nov. 18, 1952

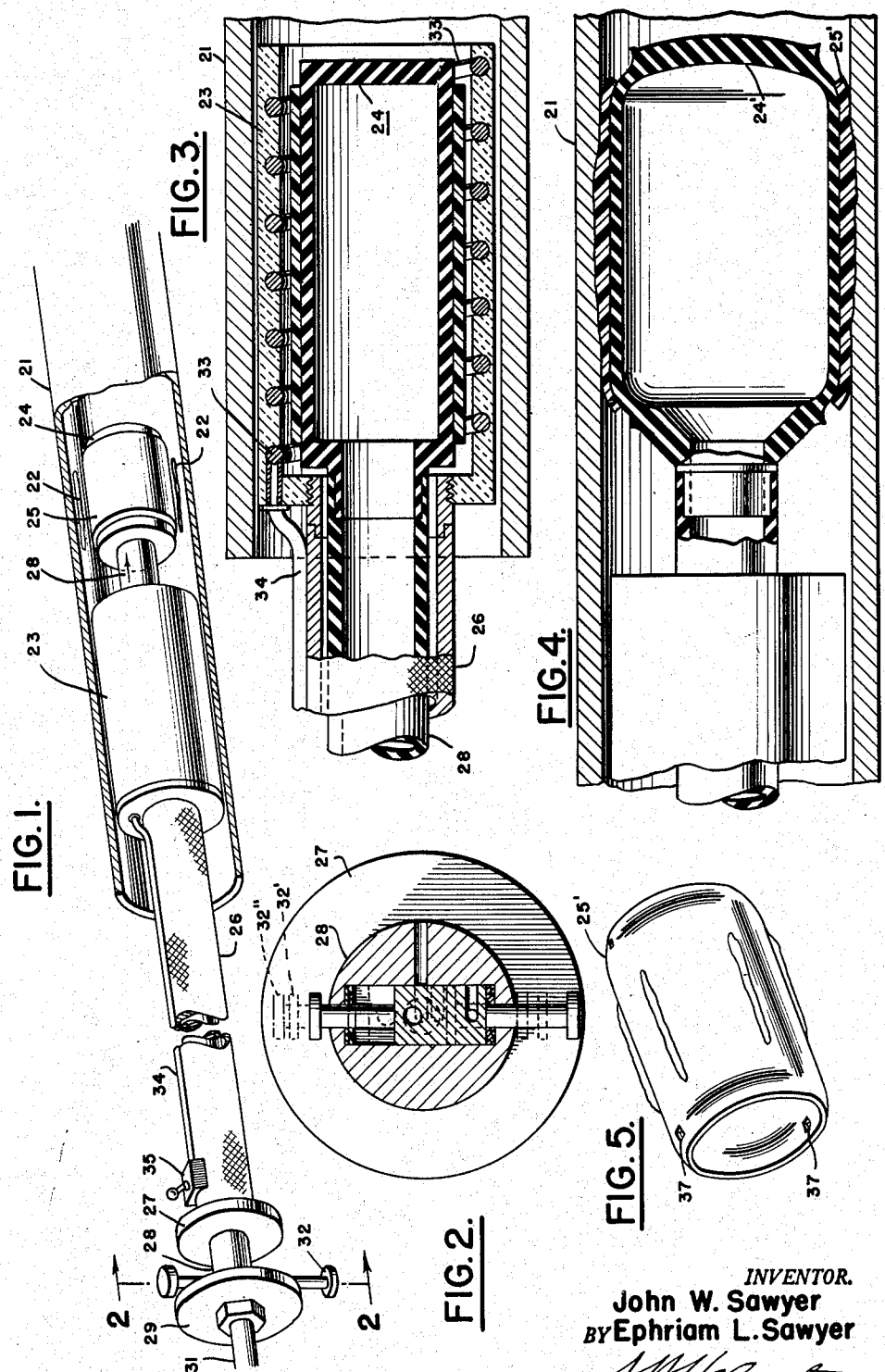

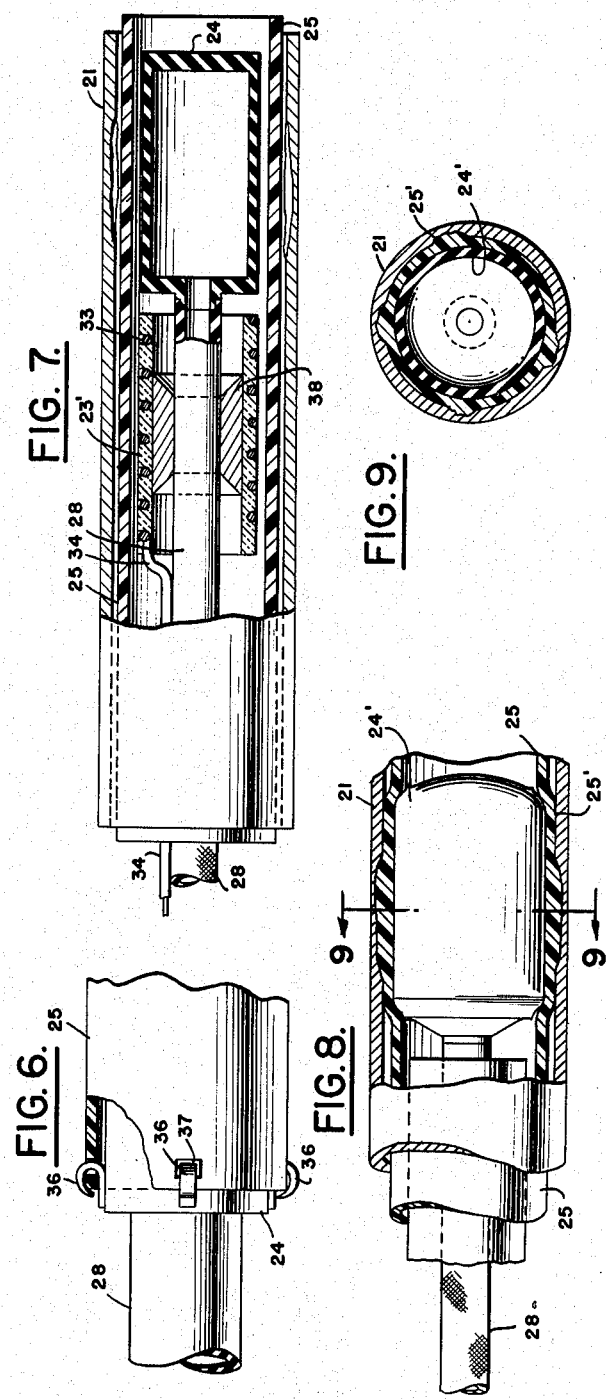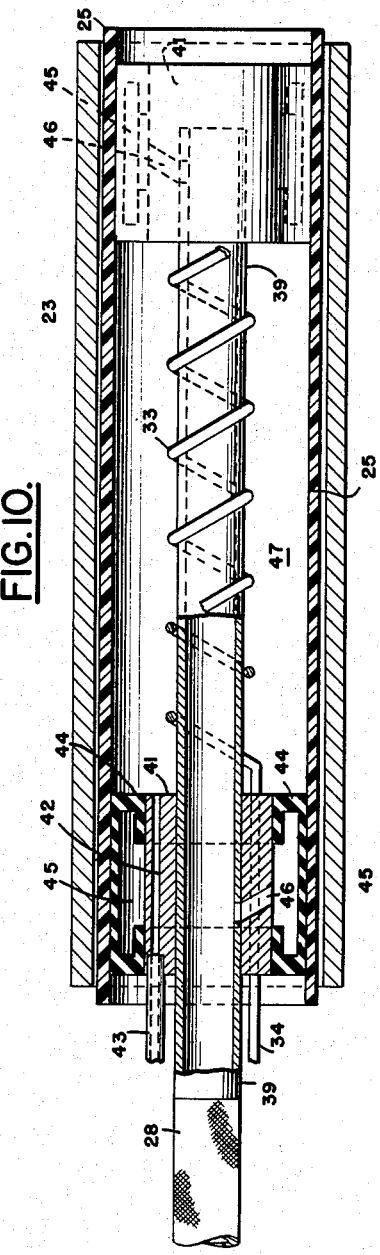

2,618,014

UNITED STATES PATENT OFFICE 2,618,014

APPARATUS FOR RECORDING SURFACE CONDITIONS INSIDE TUBULAR ELEMENTS

John W. Sawyer, United States Navy, and
Ephriam L. Sawyer, Arlington, Va.

Application June 30, 1949, Serial No. 102,184

18 Claims. (Cl. 18—5)

(Granted under the act of March 3, 1883, as
amended April 30, 1928; 370 O. G. 757)

This invention relates to the art of testing the interior surfaces of tubular structures, and more particularly to the taking of plastic surface replicas of boiler tube interiors, and the like.

It has previously been difficult or impossible to reliably examine the interior surfaces of boiler tubes to determine the nearness of ultimate failure of any portion thereof. Such tubular structures are subject to chemical action and erosion to a degree that power plant failure from that cause is likely to occur. Rebuilding at rather frequent intervals, whether needed or not, has been practiced at great expense. The present invention provides means and method of testing such structures as boiler tubes and the like, to determine which, if any, are likely to fail in near future service. The invention provides improved means of testing the rate of erosion or of deterioration of inner surfaces of pipes by periodic examination and comparison of molded replicas of the affected surfaces.

It is accordingly an object of the present invention to provide a method of determining the rate of wear or failure of remote tube interiors.

Another object of the invention is to provide means for detecting damage to boiler tubes.

A further object is to provide improved apparatus for forming molded surface replicas within tubular structures.

A still further object is to provide an improved method of measuring tubular surface irregularities.

Other objects and features of the invention will become apparent to those skilled in the art as the disclosure is made in the following detailed description of a preferred embodiment of the invention as illustrated in the accompanying sheets of drawings in which:

Fig. 1 is a perspective view according to one form of the invention, showing means for inserting and molding plastic tubing against the interior of the tube to be tested.

Fig. 2 is a sectional view along line 2—2 of Fig. 1 showing a valve arrangement for inflating the plastic tube.

Fig. 3 is a sectional view of the plastic heating arrangement of Fig. 1.

Fig. 4 is a sectional view of the expanded plastic tubing in molding contact with the boiler tube interior of Fig. 1.

Fig. 5 is a perspective view of a surface replica resulting from use of the apparatus of Figs. 1 and 3.

Fig. 6 is an elevational view of a portion of the tube expanding means showing means for securing the plastic tubing to the expanding means.

Fig. 7 is a sectional view of an alternate form of apparatus for molding successive portions of plastic tubing against the inner tubular surface.

Fig. 8 is a sectional view of a part of the structure of Fig. 7 showing the plastic tubing expanded within a tube structure.

Fig. 9 is a cross section view along the line 9—9 of Fig. 8.

Fig. 10 is a sectional view of another form of the apparatus for heating and expanding plastic tubing within a tube and beyond a constricted portion thereof.

Fig. 11 is a sectional view of a further form of the apparatus for molding plastic tubing against a tubular surface.

Fig. 12 illustrates in a sectional view a preferred apparatus for molding plastic tubing to the contours of a tube interior.

Fig. 13 is an end view, partly in section along lines 13—13 of Fig. 12.

Fig. 14 is a sectional view of one modification of the inflatable bladder employed in the several forms of the invention for avoiding air pockets between the plastic tubing and the tubular structure.

Referring now to the drawings, wherein like reference characters designate like or corresponding parts throughout the several views, there is shown in Fig. 1 a tubular structure 21 and interior surface defects therein at 22 of which it is desired to accurately record the nature and extent for laboratory measurement or analysis. Within the tube structure 21 is shown a heater housing 23, which is preferably made of rigid heat resistant material such as porcelain, or the like, and which has therein a recess substantially the full length thereof for receiving at the forward end an inflatable molding device or expander 24. On the expander 24 is fastened the plastic tubing 25 which is to be molded into intimate contact with the tube 21 to reproduce the surface detail thereof, such as the defects 22.

The housing 23 is of size suitable for easy insertion in the tube 21 and may be adapted in size and length to be passed around or through bends of the tube structure to remote locations therein. The inner surface of the housing is of suitable size to receive therein the expander 24 with the plastic tube section 25 secured thereon.

The after end of housing 23 is provided with a fitting adapted to connect to the housing a hollow flexible tube 26 of suitable length for inserting the housing in the tube 21 a desired distance. The flexible tubing may be of fabric covered rubber, flexible metallic tubing or wire mesh as desired, but having sufficient strength and rigidity to thrust the housing into the tube 21 and recover the same after a plastic impression has been taken. The outer end of the flexible tube is preferably supplied with a handle or collar 27 for ease of manipulation of the housing 23 and tube 26.

Within the tube 26 is a further flexible tube 28 which serves as an air pressure conduit and placing means for the inflating device or expander 24. The tube 28 may be of heavy rubber, plastic or the like, being supported by the surrounding tube 26 except at the ends thereof. At the forward end the tube 28 connects in air tight relation to the expander 24 at a pressure sustaining joint, preferably being cemented or clamped to a tubular fitting at the open end of the expander, to enable the expander 24 to be inflated through the tube 28.

At the outer end of the tube 28 is a collar 29 similar to the collar 27. Secured to the collar 29 is a pressure fitting for receiving the air pressure line 31, detachably secured thereto. A valve structure 32, better shown in Fig. 2, provides in the position shown an open connection from the line 31 to the tube 28 and the expander 24. An off position of the valve 32 is shown at 32', as would be used while the device is being inserted or withdrawn from the tube 21. The valve position at 32" shows the line 31 closed off from the tube 28 and the tube 28 open to the atmosphere for releasing pressure from the expander. Any suitable valve structure may be employed in place of the device 32, as desired.

In Fig. 3 is shown the housing 23 having spiral grooves therein for supporting a heater coil 33 along substantially the full length of the interior of the housing. The coil 33 connects with power leads 34 extending from housing 23 along tube 26 to the switch 35 adjacent to the control end of the device. Also shown in Fig. 3 is the inflating device or expander 24, retracted into the housing 23 in a manner to be surrounded by the coil 33. The expander may be constructed in any desirable manner of flexible material of an impervious type. For example it may be a molded rubber cylinder having a closed forward end and connected at the after end to the air line 31 by way of tube 28.

A section of plastic material is wrapped around the expander 24 and secured thereto in any desired manner. In practice it is found convenient and economical to employ for this purpose commercial thermoplastic tubing in suitable cut lengths as at 25. This tubing may vary in thickness according to the size of the apparatus and the thickness required to form a casting of the interior of tube 21, filling all defects 22. Thicknesses of the order of .020 inch are found suitable and readily available commercially.

In the use of the device of Figs. 1 to 3 the heater housing is inserted to the portion of the tube 21 to be examined, the expander being enclosed in the housing and a section of tubing or sheet plastic being secured about the inflator. The switch 35 is then operated to energize the coil 33 for a sufficient time to soften the plastic sleeve 25. The tube 26 is thereupon pushed forward to permit the expander to extend beyond the housing 23, or the housing may be withdrawn a similar distance by manipulation of tube 26, in either case leaving the heated plastic sleeve adjacent to the portion of tube surface to be tested.

The valve 32 is then operated to admit air pressure from line 31 to the inflator which is thereupon blown up to fill the diameter of tube 21. The sleeve of plastic 25, being soft is also expanded with the inflator 24 and the pressure therein forces the plastic material into the defects 22. By controlling the degree of heating from coil 33 a proper temperature of the plastic material is attained, the temperature being satisfactory over rather wide ranges of variation.

In this manner an exact negative replica of the tubular surface is formed. The plastic is quickly cooled and hardened by contact with the tube wall and the air pressure may be turned off and bled from the inflator by valve 32. The device is thereupon withdrawn from the tube 21 and the surface replica removed for laboratory testing or measurement. A sample casting or impression 25' is shown in Fig. 5, the defects 22 being exactly reproduced in negative form.

In Fig. 4 is shown the expander 24' in the expanded or blown up position thereof and the plastic sleeve 25' in molded position between the expander 24' and the tube 21. The pressure employed in the air line may be adjusted as desired to provide sufficient pressure between the expander 24' and the tube 21. The degree or duration of the heating of sleeve 25 by the coil 33 is also variable by well known means.

In Fig. 6 are shown hook members 36 secured to the inflator 24 preferably at the after end thereof, suitable for retaining the plastic tubing or sleeve 25 thereon, before and after the impression is made, in order that a finished cast impression may be readily recovered from the tube 21. Holes 37 may be punched in the tubing as desired, or by means of the sharp pointed hooks 36.

Fig. 7 shows an adaptation of the device of Fig. 1 suitable for taking a continuous impression from a remote end of a boiler tube or other structure to the near end thereof. A continuous length of plastic tubing 25 slightly smaller than the tube 21 is inserted therein and cut off at the near end thereof. The housing 23 is slightly modified as shown at 23' to have the spiral grooves in the exterior surface thereof such that the coil 33 is in grooves opening outwardly. The form 23' of the coil form is preferably of about the uninflated size of the inflator 24 and is insertable in the plastic tubing 25. In this modification of the apparatus the tubing 26 of Fig. 1 is not required and the coil form 23' is mounted in fixed position on the flexible tube 28, by means of a spacer 38.

The modification of Fig. 7 is used in a slightly different manner from that of Fig. 1. In this case the heater is energized until the section of tube 25 adjacent thereto is softened. The mold structure is then withdrawn from the tube by a distance corresponding to the spacing between the coil form and the expander, and the expander expanded as hereinbefore described to mold the adjacent portion of the tube 25 against the tube 21. The pressure is then released and the next adjacent portion similarly molded. It is found convenient to energize the coil 33 just sufficiently to provide softening of the next adjacent section of tubing 25 during the molding of the preceding section, so that the molding of sections is accomplished in continuous rapid succession until the entire tube 21 is completed, without de-energizing the coil 33. In Figs. 8 and 9 a mid-portion of the plastic sleeve 25 is shown expanded at 25' by the inflation of the expander as at 24'.

A second modification of the expander apparatus is shown in Fig. 10, wherein the coil 33 is supported on a metallic extension 39 of the air tube 28 which is centrally located within tube structure 21 by means of spacer block insulator 41 which is tightly fitted on the metallic tube 39. Longitudinally through the insulator 41 is an aperture 42 and a fitting 43 connecting with an air line to an air pressure source for inflating the section of tube 25 adjacent the coil 33. In this modification no housing is provided for the coil. There is no expander and the air pressure is retained by means of inflatable dams at the ends of the metallic tube 39. These dams preferably are of thin section rubber and of hollow construction, the end walls 44 thereof being adjacent the respective ends of insulators 41, and having air cavities 45 for receiving pressure to expand the dams by way of ports 46 connecting with tube 28.

In this modification, like that of Fig. 7, a long section of plastic tube 25 is preferably employed, the tube 25 first being inserted in the tube 21 for such portions thereof as are to be tested. Tube 28, extension 39 and the structure thereon are then inserted as desired. Air pressure is then applied by way of tube 28 to inflate the dams forcing the outer walls of cavities 45 into contact with the plastic tube 25 and sealing the air cavity 47 at both ends thereof. Since the tube 25 is cold at the ends there is no molding thereof about the dam cavities 45. As the coil 33 is heated and the plastic tubing 25 adjacent thereto softened air pressure is introduced in the cavity 47 by way of the fixture 43 and the section of plastic tubing expanded. The pressure may then be released at cavities 45 and 47 and a next section of tubing similarly molded.

In Fig. 11 is a further modification generally similar to that of Fig. 7 except that the coil form and expander are reversed in position and the leads 34 to the coil 33 are arranged within the tube 28'. Graduations may be provided along the tube to indicate the distance from the opening of tube 21 at which the expander 24" is located. Ports 48 in tube 28' admit air to the cavity of the expander 24", here illustrated as formed about the tube 28'. The end of the tube 28' is preferably closed by a stopper as at 49. In the use of the apparatus of Fig. 11 it is convenient to begin forming the tube surface replica at the near end of the tube 21, heating a section of tube 25, advancing the expander 24" to the heated position and while heating the next adjacent portion, forming the replica at the first heated region, etc. until the entire tube has been completed.

In the modification of the apparatus shown in Fig. 12, which is for many purposes the preferred embodiment of the invention, the construction of the coil form is of the form shown in Fig. 7 and the plastic tube section is not directly heated by the coil 33. In this form the arrangement of Fig. 7 is employed except that it is generally preferred to use a short length of plastic tubing 25, extending only the length of the expander 24, and secured thereto at both ends by hooks 36 or the like and eyes as at 37. The plastic sleeve is thus never brought into position adjacent to the heater coil 33, and the heating is performed indirectly. A test location is selected and the apparatus inserted a suitable distance measured by the length of air tubing 28 which is inserted in tube 21. The coil 33 is then energized and the tube 21 locally heated. Then the tube 28 is withdrawn until the member 24 is at the test location, and air pressure is applied to inflate member 24. As the pressure is first applied the plastic tubing may fail to expand, but after a slight delay for transfer of heat from the tube 21 to the plastic the plastic becomes soft and assumes the desired shape under plastic flow conditions.

In this manner the tube is warmed and the plastic is permitted to flow into intimate contact therewith without cooling. A more certain and more accurate surface impression is thereby assured. The pressure is then released and the section of plastic tubing is removed for study.

Fig. 13 shows details of fastening ends of the plastic sleeve to the member 24 and Fig. 14 shows means assuring that no gas pockets are present between the plastic and the tube 21. The member 24 is provided with an outer wall of varying thickness or strength, progressively changing from one end to the other, or, if desired, from the middle to each end. In this manner the weaker portion of the wall of 24 expands first and provides ring contact between the plastic tubing and the tube 21. Thereafter as pressure increases the area of molding contact progresses evenly to the opposite end of the member 24 and drives all air out as the expansion progresses along the length thereof, and air pockets are effectively prevented. This form of the member 24 is separately shown, but replaces the straight sections shown in each of the modifications, being a preferred form thereof.

By the use of the apparatus shown in the manner described in each modification thereof it is seen that a method of forming of interior surface replicas of long tubes is provided, and a method of casting surface replicas in remote regions of a tube, beyond constrictions in the walls of the tube, or around bends therein. It is found practicable to completely test the interior of a boiler tube, for example, which extends the length of a boiler and back through a turn of 180°, provided the bend in the tube is not characterized by sharp corners. It is to be understood that various leader devices or guides may be attached to the forward end of the device to facilitate passage around bends and elbows.

The method of casting of tubular replicas herein disclosed is adaptable to continuous or intermittent use and is combined with testing procedures whereby periodic tests may be made of the same critical areas in tubular structures whereby the periodic microscopic or analytical measurement of growth of deterioration of a tubular structure provides measurement of the rate of deterioration of a structure and a quantitatively measured prediction of ultimate failure.

It should be understood, of course, that the foregoing disclosure relates to only preferred embodiments of the invention and that numerous modifications or alterations may be made therein without departing from the spirit and the scope of the invention as set forth in the appended claims.

The invention described herein may be manufactured and used by or for the Government of the United States of America for governmental purposes without the payment of any royalties thereon or therefor.

Having thus described the invention, what is claimed is:

1. In a device for forming negative surface replicas of tube interiors from a section of plastic tubing secured to the device, air pressure supply means, means connecting said air pressure means with said tubing, a heater coil energizable at will by remote connections, said coil being mounted in said device adjacent to said tubing for transfer of heat thereto, means for positioning the section of tubing heated relative to desired portions of tube interior, means controlling said air pressure during energization of said coil for forcing said tubing into molding contact with said tube portions, and means for releasing the air pressure after said molding to permit withdrawal of the molded tubing from the tube interior.

2. In a device for molding plastic replicas of tube interior surfaces, a hollow coil form having a heating coil thereon, electrical connections for energizing said coil remotely at will, flexible means for placing said coil form at a desired location within said tube interior, a flexible air line concentric with said placing means, a flexible inflator connected to the inner end of the air line in airtight relation therewith and adapted to support a length of thermoplastic tubing thereabout, means remotely controlling the pressure in said inflator at will, means for adjusting the relative positions of said inflator and said coil form within the tube interior, whereby the tubing is heated and expanded into molding contact with the tube interior.

3. In a device for molding plastic replicas of tube interior surfaces from a length of plastic tubing within said tube interior, an air bladder within said tubing, means inflating said bladder at will, electrical heating means concentrically arranged with the plastic tubing for local heating thereof at will, means longitudinally displacing said heating means and said bladder after heating and prior to inflation of the bladder, and means for removing the device from the tube interior after inflation of the bladder.

4. In a device for producing negative surface replicas of a tube interior, an inflatable bladder of cylindrical form within said tube adapted to support a section of thermoplastic tubing thereabout, a flexible air line extending beyond the tube and connected to the bladder for inflation thereof, means for locally heating said thermoplastic tubing adjacent the bladder, means effective when the tubing has heated sufficiently for molding to inflate the bladder through said air line and form said surface replica, and means for deflating the bladder and removing the molded tubing section from the tube interior.

5. In a device for forming thermoplastic tubing into a molded interior surface pattern of a tubular structure, a coil and housing therefor of cylindrical form within said tubular structure, a flexible tubular handle attached to said coil form and extending beyond the tubular structure, a flexible tubular conduit within said handle, a resilient expander member connected to said conduit, said member being constructed and arranged for placement within said housing during energization of the coil and extension therebeyond at will and for supporting thereon a section of thermoplastic tubing, and means for controlling the energization of the coil, the application of expanding pressure through said conduit and the positioning of said housing and said expander from outside the tubular structure.

6. A molding device for tubular thermoplastic material within a tubular structure comprising a cylindrical bladder within the plastic material, a heater coil spaced longitudinally adjacent said bladder, a flexible tube connected to said bladder and an external source of pressure, heater coil controls extending along said flexible tube means effective to longitudinally shift said coil and bladder within the thermoplastic tubing by a distance equal to the relative spacing thereof as the thermoplastic material is heated to a molding temperature and means for applying said pressure to expand the thermoplastic material when said means has shifted the bladder to a position within the heated portion of tubing.

7. A device for molding successive portions of plastic tubing within a tubular structure having a plastic tubing extending along the interior surface of said tubular structure, comprising, a flexible tubing extending within said structure, a coil surrounding an inner end portion of said pressure tubing, externally energized, a hollow flexible and inflatable dam at either end of said coil and having parts connecting the hollow portions thereof to said pressure tubing, the dams being constructed and arranged to seal a pressure chamber within a portion of said plastic tubing surrounding said coil as the pressure is applied in the pressure tubing, means for heating said coil, means including parts connecting said pressure chamber to said pressure tubing for inflating the pressurized portion of plastic tubing after the coil has been heated, and means for periodically releasing said pressure to facilitate successive movement of the device within the plastic tubing as sections thereof are inflated to molding contact with said tubular structure.

8. A mold for tubing comprising a tubular structure the inner surface of which is to be cast, a cylindrical expandable member within said structure adapted for support of a sheet thermoplastic material surrounding said expandable member, a flexible pressure line extending beyond said tubular structure and connecting a controlled pressure source to the expandable member for expansion thereof, a heater coil supported on said pressure line and constructed and arranged to locally heat a section of the tubular structure, means energizing said coil variably at will, and means for placing the coil at a desired location in the tubular structure during said energization, said means also being employable for removing the cast plastic section after the expander has been expanded and contracted.

9. In a device for molding sheet plastic material in contact with a tube interior, a heater coil within said tube, external electrical controls for said coil, a bladder attached in longitudinal juxtaposition to said coil within the tube arranged to receive a sheet of plastic material surrounding said bladder and attached thereto, a flexible pressure line connecting said bladder to an external pressure source and having rigidity sufficient for positioning the bladder and coil at desired locations within the tube, and means for applying pressure to inflate the bladder to mold the sheet plastic against a heated portion of the tube.

10. In a device for molding an internal replica of a boiler tube, means including a heating coil and external controls therefor for supplying heat to soften the molding material, an elongated inserting means for said coil extending along said controls to the exterior of said tube, an air pressure line substantially coextensive with said inserting means and including air pressure control means therefor, means integrally connecting with the inner end of said pressure line for forming end wall barrier members and a resilient walled air pressure chamber, last said means being adapted to support a tubular sheet of thermoplastic molding material extending exteriorly of the air in said pressure chamber and interiorly of the tube to be molded, whereby air pressure in said chamber tends to expand said tubular sheet into contact with the interior of said tube, and means controlable by an operator for transferring a desired quantity of heat from said coil to said tubular sheet sufficient to render the tubular sheet highly plastic under the air presure in said chamber.

11. A device for forming surface replicas of tube interiors comprising from a tubular sheet of thermoplastic material of diameter less than the diameter of said tube, means including inner and outer end members forming an air chamber within said tubular sheet, coil means supplying heat internally within said tube under control of an operator to render said tubular sheet plastic, air conducting means connecting an external source of compressed air to said chamber through said outer end member, means controlling the supply of air pressure to said chamber at will for expanding said tubular sheet, when heated, in to contact with said tube interior, and means adjusting the position of said chamber prior to said expansion, said last means extending beyond said tube and being attached to said coil for control of the location thereof within the tube.

12. The method of forming an internal surface replica of a tube comprising the steps of locating a heating element within said tube, locally heating the interior surface of said tube by said heating element at least to the softening temperature of a thermoplastic material, expanding a length of tubular thermoplastic material against said heated surface, and cooling the surface while the plastic material is in contact therewith.

13. The method of taking a negative surface replica of a tube interior surface comprising inserting a thermoplastic tube therein, locally heating sections thereof to the thermoplastic softening temperature in progressive succession, forcing said heating sections into contact with the said interior surface of the tube, said sections being allowed to cool while the next successive section is being heated, and removing said thermoplastic tube after the last heated section thereof has been cooled.

14. In a device for producing negative surface replicas of a tube interior from a length of plastic material adapted to be positioned in said tube comprising, the combination of a closed expandable member positionable within said plastic material, a source of fluid supply, a fluid supply line connected at one end to said source of supply and at the other end to said expandable member, heating means for imparting heat to said plastic material, and a supporting member mounting said heating means and said expandable member.

15. In a device for producing negative surface replicas of a tube interior from a length of plastic material adapted to be positioned in said tube, comprising, the combination of heating means positionable within said tube for imparting heat to said material, said heating means comprising a supporting member mounted for reciprocating movement, a heating element on said supporting member, expandable means for urging said plastic material into engagement with the interior surface of said tube, and a flexible member connecting such expandable means with said heating means.

16. The combination according to claim 15 wherein said means for urging the plastic material into engagement with the interior surface of said tube comprises a closed expandable member having walls of varying thickness, and fluid supply means connected to said expander, whereby fluid expanding said expandable member causes the walls thereof to progressively engage said plastic material along its length.

17. In a device for producing negative surface replicas of a tube interior from a length of tubular plastic material adapted to be positioned in said tube comprising, the combination of a closed expandable member positionable interiorly of said plastic material, a source of fluid supply, a flexible conduit connected at one end of said source of fluid supply and at its other end to said expandable member, a heating member in said tube for imparting heat to said plastic material, said heating member comprising a cylinder having heating means therein, means controlling the amount of heat emitted by said heating means, and means mounting said heating element and said expandable member for reciprocating movement longitudinally of said tube.

18. In a device for forming a tubular replica of the interior surface of a boiler tube from a length of plastic tubing comprising, the combination of an elongated handle means for placing said length of tubing remotely within said tube at any selected location, said handle means having a portion adapted to carry said tubing, means for locally heating said tubing while positioned in the tube, said handle means comprising an air supply tube through which air under pressure can pass for applying air pressure within said tubing to moldingly expand a locally heated portion thereof, and means associated with said handle means for releasing said air pressure to permit recovery of the molded tubing from the tube interior.

JOHN W. SAWYER.
EPHRIAM L. SAWYER.

REFERENCES CITED

The following references are of record in the file of this patent:

UNITED STATES PATENTS

| Number | Name | Date |
| --- | --- | --- |
| 672,909 | Lefferts | Apr. 30, 1901 |
| 689,408 | Petit | Dec. 24, 1901 |
| 1,052,081 | Miltner | Feb. 4, 1913 |
| 1,794,199 | Nose | Feb. 24, 1931 |
| 1,986,629 | Fenton | Jan. 1, 1935 |
| 2,206,410 | Lally | July 2, 1940 |
| 2,327,781 | Glynn | Aug. 24, 1943 |
| 2,395,216 | Fitzpatrick | Feb. 19, 1946 |
| 2,405,245 | Ushakoff | Aug. 6, 1946 |